Dec. 15, 1953     M. H. EMRICK     2,662,774
JAW CONTROL FOR CHUCK DEVICES
Filed Nov. 30, 1951
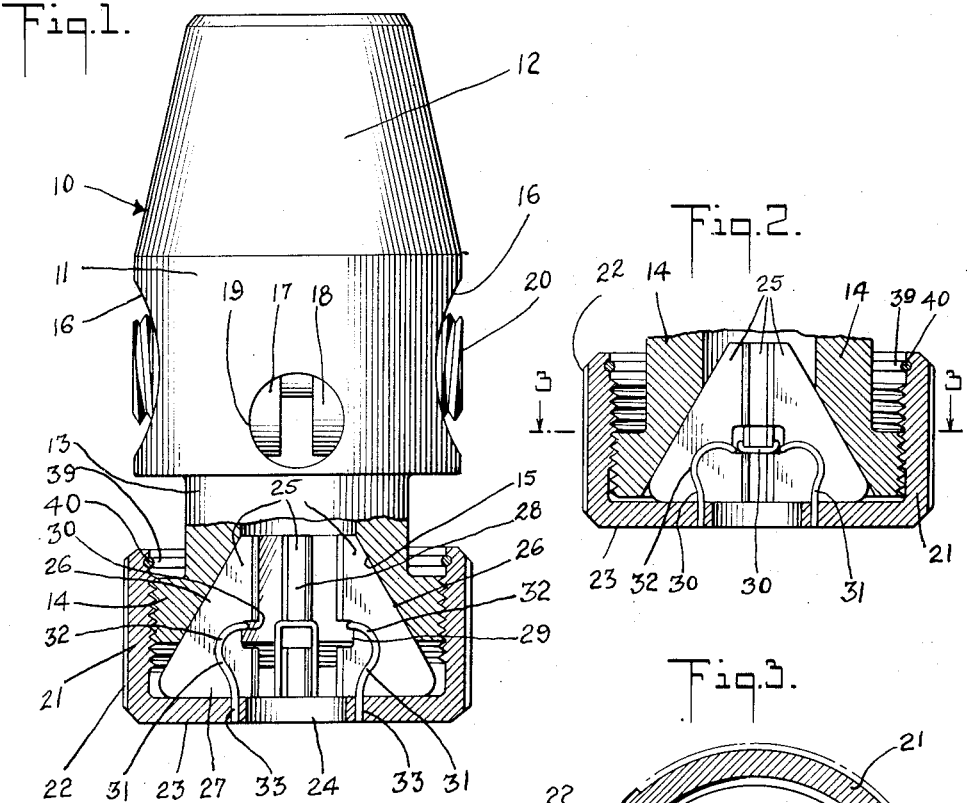
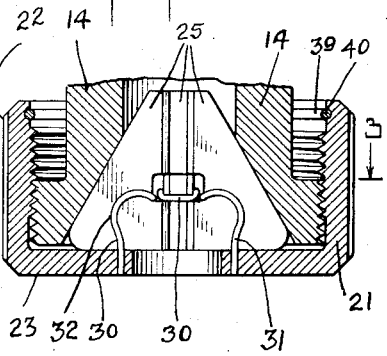
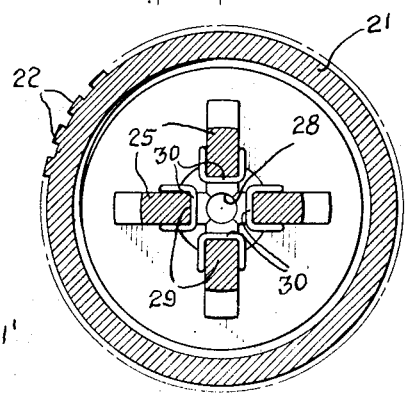
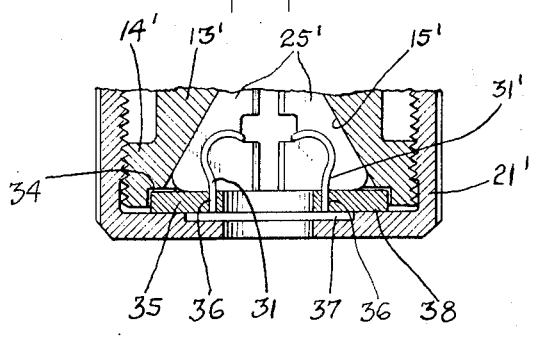
INVENTOR
MELVIN H. EMRICK
BY
ATTORNEY Patented Dec. 15, 1953

2,662,774

UNITED STATES PATENT OFFICE 2,662,774

JAW CONTROL FOR CHUCK DEVICES

Melvin H. Emrick, Jamaica, N. Y.

Application November 30, 1951, Serial No. 259,139

8 Claims. (Cl. 279—59)

This invention relates to chuck devices for supporting drills, taps and the like. More particularly, the invention deals with the resilient support of the tool gripping jaws of devices of this kind to provide a simple spring action of the jaws, as well as to position the jaws within the chuck, thus dispensing with the use of the conventional guide grooves for guiding the jaws in the chuck body.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a side view of a chuck showing the lower portion in transverse section.

Fig. 2 is a view similar to Fig. 1, showing only a part of the construction and with the jaws in a different position.

Fig. 3 is a section on the line 3—3 of Fig. 2 taken through the jaws and the jaw operating sleeve only; and Fig. 4 is a view, similar to Fig. 2, omitting part of the construction and showing a modification.

In Fig. 1 of the drawing, I have shown at 10 the body portion of a chuck, which has a central cylindrical portion 11, an outwardly tapered upper end 12, a reduced neck or collar portion 13 and an externally threaded enlargement 14. The enlargement 14 has a conical bore 15 which flares outwardly in the direction of the lower end of the threaded enlargement 14.

The central cylindrical portion 11 has a transverse bore, partially represented by the recessed sides 16, in which the shank gripping members 17 and 18 are disposed, as will appear through a transverse bore 19, which opens into the first named bore at a point offset with respect to the center thereof. The transverse bore 19 gives vision for positioning of the shank between the members 17 and 18. At 20 is shown a left and right-hand screw for actuating the members 17 and 18.

In threaded engagement with the enlarged threaded portion 14 is a bore operating sleeve nut or cap 21, having the usual gripper surface 22 to facilitate hand rotation thereof. The lower wall 23 of the nut 21 has a central bore 24 for reception of the shank of a tool to be pressed into the chuck between a plurality of jaws 25, four jaws being employed in the construction shown, note Fig. 3.

As each jaw 25 is of the same construction, the brief description of one will apply to all and similar references will be used on each jaw. Each jaw has a bevelled outer surface 26 adapted to operate on the conical bore 15 in movement of the jaws inwardly from the fully open position shown in Fig. 1 of the drawing to the fully closed position, shown in Figs. 2 and 3.

The jaws are generally triangular in form and their lower edges 27 rest upon the wall 23; whereas, their inner edges 28 are contracted to form the tool gripping surfaces or jaws, as will be apparent, and these jaws are slightly concaved, as will appear from a consideration of Fig. 3 of the drawing.

The gripping surfaces are recessed as seen at 29 preferably at a position slightly closer to the lower edge 27 than the upper ends of the jaws and, fitting in the recesses 29, are the crossheads 30 of yoke-shaped spring members 31. The side portions of the spring members 31, adjacent the crossheads 30, are bowed radially, as seen at 32, to give spring properties to these members and also to spread over side surfaces of the jaws 25, as will be apparent. The ends of the spring members fit in apertures 33 in the wall 23. It will thus be apparent that the spring members are definitely positioned on and are movable with the nut 21 in rotation thereof for movement of the jaws from the position shown in Fig. 1 to the position shown in Figs. 2 and 3. In Fig. 3 of the drawing, the neck 13 and enlarged portion 14 are omitted for sake of clarity in the showing. In other words, the section would be a section through the nut 21 detached with respect to the body 10.

In Fig. 3, part of the gripper surface 22 has been indicated again to simplify the showing, it being understood that the gripper surface 22 extends the full circumference of the nut 21.

With the structure shown in Figs. 1 to 3, it will be understood that the spring members 31 are tensioned to normally support the jaws 25 in the extended position shown in Fig. 1 of the drawing and inward movement of the jaws to the position shown in Fig. 2 increases the tension of said spring members.

In Fig. 4 of the drawing, I have shown a modification, wherein the chuck body is the same as in the structure shown in Fig. 1, the neck portion 13' and enlarged threaded portion 14' only being shown. The enlarged threaded portion 14' has, at its lower end, a recess 34 for receiving a jaw supporting ring 35.

The jaws 25' are identical with the jaws 25, as are also the spring members 31', the only difference being that the ends of the spring members operate in apertures 36 in the ring 35, so as to be supported by the ring and the nut 21' is also preferably recessed, as seen at 37, so as to minimize the surface engagement between the nut and the ring, as indicated at 38.

With the structure shown in Fig. 4, it will be understood that the jaws 25' will establish frictional engagement with the conical bore 15' and thus minimize rotary movement of the jaws in said bore; whereas, with the structures shown in Figs. 1 to 3, inclusive, the jaws will rotate with the nut 21 in movement of the jaws into open and closed positions.

One of the advantages in the jaw mounting and operation herein disclosed is in eliminating the use of the conventional guide grooves, as commonly employed in chuck bodies to guide the jaws in their radial movement, thus avoiding the stresses and strains and wear which prevails in devices of this kind. With the present construction, the wear is distributed throughout the entire surface 15, 15' and so proportioned as to give longer use to the chuck device.

In Fig. 4, the jaw member between and behind the two jaw members 25' has been omitted for sake of clarity.

It will be noted from a consideration of Fig. 1 of the drawing that a split ring 39 is mounted in a groove 40 of the nut 21 to retain the nut against accidental unthreading from the body 10. Removal of the ring 39 will facilitate detachment of the nut.

Having fully described my invention, what I claim as new and desire to secure by Letters Patent is:

1. A chuck device of the character described, comprising a tubular chuck body having an externally threaded lower end portion, said lower end portion having a conical bore opening outwardly through said end, a plurality of tool gripping jaws mounted in said conical bore, said jaws having bevelled surfaces operating upon the walls of said conical bore in controlling movement of the jaws toward and from each other, inner edge portions of the jaws having elongated gripper surfaces, said gripper surfaces having recesses, means controlling positioning of the jaws one with respect to the other, a yoke-shaped spring engaging each of said jaws, each spring having a crosshead and side members, the crossheads being arranged in said recesses, and said springs being tensioned to maintain the jaws in constant engagement with the walls of said conical bore.

2. A chuck device of the character described, comprising a tubular chuck body having an externally threaded lower end portion, said lower end portion having a conical bore opening outwardly through said end, a plurality of tool gripping jaws mounted in said conical bore, said jaws having bevelled surfaces operating upon the walls of said conical bore in controlling movement of the jaws toward and from each other, inner edge portions of the jaws having elongated gripper surfaces, said gripper surfaces having recesses, means controlling positioning of the jaws one with respect to the other, a yoke-shaped spring engaging each of said jaws, each spring having a crosshead and side members, the crossheads being arranged in said recesses, said springs being tensioned to maintain the jaws in constant engagement with the walls of said conical bore, and side members of each of said springs being bowed and bear upon opposed side surfaces of the jaws in support of the jaws in said conical bore.

3. A chuck device of the character described, comprising a tubular chuck body having an externally threaded lower end portion, said lower end portion having a conical bore opening outwardly through said end, a plurality of tool gripping jaws mounted in said conical bore, said jaws having bevelled surfaces operating upon the walls of said conical bore in controlling movement of the jaws toward and from each other, inner edge portions of the jaws having elongated gripper surfaces, said gripper surfaces having recesses, means controlling positioning of the jaws one with respect to the other, a yoke-shaped spring engaging each of said jaws, each spring having a crosshead and side members, the crossheads being arranged in said recesses, said springs being tensioned to maintain the jaws in constant engagement with the walls of said conical bore, side members of each of said springs being bowed and bear upon opposed side surfaces of the jaws in support of the jaws in said conical bore, and the ends of said side portions of the springs being supported in a part movable with respect to said chuck body.

4. A chuck device of the character described, comprising a tubular chuck body having an externally threaded lower end portion, said lower end portion having a conical bore opening outwardly through said end, a plurality of tool gripping jaws mounted in said conical bore, said jaws having bevelled surfaces operating upon the walls of said conical bore in controlling movement of the jaws toward and from each other, inner edge portions of the jaws having elongated gripper surfaces, a cap-shaped nut mounted on the threaded portion of said chuck body, said nut controlling positioning of the jaws one with respect to the other, a yoke-shaped spring engaging each of said jaws, said springs being tensioned to maintain the jaws in constant engagement with the walls of said conical bore, said jaws being substantially triangular in form, the springs having crossheads, adjacent edges of the jaws being recessed to receive the crosshead of said springs, each of said springs having bowed side portions bearing upon opposed side surfaces of the jaws in support of the jaws in said conical bore, a ring disposed between the nut and said jaws, and said springs being coupled with said ring.

5. In chuck devices employing a plurality of circumferentially spaced tool gripping jaws and a manually operated member for controlling positioning of adjacent gripper edges of the jaws with respect to each other, the chuck body, in which the jaws are mounted, having a conical bore, said jaws having bevelled surfaces engaging the walls of the conical bore, yoke-shaped springs coupled with said jaws and having side members engaging opposed surfaces of the jaws to support the jaws in predetermined alinement in said conical bore, means engaging the springs for circumferentially spacing the jaws one with respect to the other, adjacent gripper edges of the jaws having recesses, and said springs having crossheads arranged in said recesses of the jaws.

6. In chuck devices employing a plurality of circumferentially spaced tool gripping jaws and a manually operated member for controlling positioning of adjacent gripper edges of the jaws with respect to each other, the chuck body, in which the jaws are mounted, having a conical bore, said jaws having bevelled surfaces engaging the walls of the conical bore, yoke-shaped springs coupled with said jaws and having side members engaging opposed surfaces of the jaws to support the jaws in predetermined alinement in said conical bore, means engaging the springs for circumferentially spacing the jaws one with respect to the other, adjacent gripper edges of the jaws having recesses, said springs having crossheads arranged in said recesses of the jaws, and the side members of the springs engaging side surfaces of the jaws being bowed.

7. In chuck devices, a chuck body having a conical bore at one end, a plurality of gripping jaws spaced circumferentially in said body, means rotatable on the chuck body for moving gripper edges of said jaws toward and from each other in engaging and disengaging a tool for support in the chuck body, each jaw having a yoke-shaped spring for maintaining the jaws in constant engagement with said bevelled bore, said jaws having recesses on inner gripper edges thereof, said springs having crossheads operating in said recesses and side members engaging side surfaces of said jaws, said jaws being rotatable in the bore in movement of the jaws toward and from each other, and said springs maintaining the jaws in circumferential spaced relationship to each other.

8. In chuck devices, a chuck body having a conical bore at one end, a plurality of gripping jaws spaced circumferentially in said body, means rotatable on the chuck body for moving gripper edges of said jaws toward and from each other in engaging and disengaging a tool for support in the chuck body, each jaw having a yoke-shaped spring for maintaining the jaws in constant engagement with said bevelled bore, said jaws having recesses on inner gripper edges thereof, said springs having crossheads operating in said recesses and side members engaging side surfaces of said jaws, said jaws being rotatable in the bore in movement of the jaws toward and from each other, and means with which said springs are coupled for maintaining the jaws in circumferentially spaced relationship to each other.

MELVIN H. EMRICK.

References Cited in the file of this patent

UNITED STATES PATENTS

| Number | Name | Date |
|---|---|---|
| 1,593,908 | Miller | July 27, 1926 |
| 1,620,440 | Cary | Mar. 8, 1927 |
| 1,775,992 | Emrick | Sept. 16, 1930 |
| 1,985,586 | Stoner | Dec. 25, 1934 |
| 2,253,345 | Palmgren | Aug. 19, 1941 |